United States Patent
Arnold (10) Patent No.: US 6,175,924 B1
(45) Date of Patent: Jan. 16, 2001

(54) METHOD AND APPARATUS FOR PROTECTING APPLICATION DATA IN SECURE STORAGE AREAS

(75) Inventor: Todd Weston Arnold, Charlotte, NC (US)

(73) Assignee: International Business Machines Corp., Armonk, NY (US)

( * ) Notice: Under 35 U.S.C. 154(b), the term of this patent shall be extended for 0 days.

(21) Appl. No.: 08/877,776

(22) Filed: Jun. 20, 1997

(51) Int. Cl.$^7$ ..................................................... G06F 11/30
(52) U.S. Cl. .......................... 713/189; 380/282; 380/201; 713/188; 713/191; 713/193; 713/194; 713/200; 711/147; 711/150
(58) Field of Search ................................... 380/4, 25, 30, 380/201, 282; 713/188, 189, 191, 193, 194, 200; 711/147, 150, 151, 163, 164

(56) References Cited

U.S. PATENT DOCUMENTS

| | | | |
|---|---|---|---|
| 5,027,397 | 6/1991 | Double et al. | 380/4 |
| 5,048,085 | * 9/1991 | Abraham et al. | 380/23 |
| 5,148,461 | * 9/1992 | Abraham et al. | 380/46 |
| 5,159,629 | 10/1992 | Double et al. | 380/4 |
| 5,371,793 | * 12/1994 | Kimura | 380/4 |
| 5,412,717 | * 5/1995 | Fischer | 380/4 |
| 5,526,428 | * 6/1996 | Arnold | 380/25 |
| 5,579,393 | * 11/1996 | Conner et al. | 380/25 |
| 5,604,800 | * 2/1997 | Johnson et al. | 380/4 |
| 5,724,425 | 3/1998 | Chang et al. | 380/25 |
| 5,727,061 | * 3/1998 | Johnson et al. | 380/25 |
| 5,778,070 | * 7/1998 | Mattison | 380/25 |

FOREIGN PATENT DOCUMENTS

| | | |
|---|---|---|
| 0754999 | 1/1997 | (EP) . |
| 0778520 | 6/1997 | (EP) ................................. G06F/9/46 |
| 8166879 | 6/1996 | (JP) . |

OTHER PUBLICATIONS

Schneier, Applied Cryptography, 2nd edition, p. 39.*
IBM Technical Disclosure Bulletin, vol. 39, No. 6; Secure Loading of a Personal Computer Application; Jun. 1996; pp. 131 & 132.
Derwent Publications LTD., London, GB; Database WPI; Week 9803; N 98–023882.
Derwent Publications LTD., London, GB; Database WPI; Week 9803; AN 98–029578.
Name of Article: ActiveX Programming13 Safe Web Surfing with the Internet Component Download Service; Author Mary Kirkland; Name of Journal: Microsoft System Journal, Oct. 1996, ASCII, No. 45, pp. 38–48.
Name of Article: Counterplan for Computer Virus in Internet Age; Author: Tatsu Nakamura; Name of Journal: Nikkei Computer, Feb. 3, 1997, pp. 146–152.
Name of Article: The Status and Counterplan for Computer Virus in Japan; Author: Eiji Okamoto, Tadanao Yamada, Norio Saito Name of Journal: Information Processing, Jul. 1992, vol. 33, No. 7, pp. 811–819.

* cited by examiner

Primary Examiner—Tod R. Swann
Assistant Examiner—Paul E. Callahan
(74) Attorney, Agent, or Firm—Karl O. Hesse (57) ABSTRACT

A method, apparatus and computer program product are disclosed for certifying the authenticity of an application program and for securely associating certified application programs whose certification has been verified, with persistent application data that they own. The invention prevents other application programs, including certified application programs whose certifications have been verified, from accessing data not of their own.

6 Claims, 5 Drawing Sheets

METHOD AND APPARATUS FOR PROTECTING APPLICATION DATA IN SECURE STORAGE AREAS

BACKGROUND OF THE INVENTION

1. Field of the Invention

The present invention relates to a method and apparatus for controlling the authenticity of application programs received from unsecured storage and for controlling data access by such programs as they run in a secure environment in a computer in order to preserve system security.

2. Description of Related Art

The use of apparatus and programmed methods to prevent application programs from accessing or modifying protected areas of storage in a data processing system are known in the operating system art. Examples are the U.S. Pat. Nos. 5,144,659 and 5,289,540 to Richard P. Jones. Jones discloses hardware in the form of a programmable auxiliary memory and control unit on a disk drive adapter card which intercepts the control logic, address, and data signal paths between the central processing unit and the file storage. Once the hardware and associated software of the Jones system is installed, the operating system no longer controls or has access to the file system. In Jones, the auxiliary memory stores signatures of all valid files. The file signatures are simple cyclic redundancy code (CRC). Such signatures can protect against virus attack by detecting that the file has been changed by a virus since the CRC was last calculated. Such signature can not protect against hacker attack because it is a simple matter to calculate and append a new CRC after changing a program.

More recently, the hardware central processing unit (CPU) itself has privilege levels built in that protect memory segments having a level zero for example from being directly addressed by application programs running at level 3. An example appears in the Am486 Microprocessor Software Users Manual published January 1994 by Advanced Micro Devices at pages A-28 through A-34. Although these circuits prevent direct addressing of supervisor level memory space by level 3 application programs, there will be times when such access is necessary and there is no mechanism in the microprocessor for determining that the application program is authentic and that the data to be accessed is allocated to the authentic program.

The use of encryption to verify the identity of users and the authenticity of programs or ID Cards is known. An example of such art is the IBM 4755 cryptographic adapter card. The teaching of the current art do not however show how to protect persistent data in a secure area when applications are loaded from non-secure sources.

In computer systems that run multiple application programs, and have the ability to store long-term data for those programs, there is a need to protect each data area from application programs other than the one which created that area. The term "other programs" is meant to include both entirely different programs, and programs which may attempt to masquerade as the program that created the data. New versions of any program, however, must be able to access the data areas created by the earlier versions of that same program.

In this particular scenario, the data is persistent in computer memory, while the application programs themselves are not. The application programs are deleted from memory when they are no longer needed, and then they are reloaded at a later time when their services are again required. The data areas used by each application program remain in the computer, stored on a persistent medium and managed by the computer's operating system. When an application program is reloaded, it must be given access to the data which it owns, but it must not be permitted to access data owned by another application program. In like manner, application programs that are operating concurrently must not be able to access each others data. The program storage medium itself from which application programs are reloaded is not necessarily protected in any way, so the application programs must be structured so that they carry their own protection from alteration, and so that they contain protected information that can be used to securely associate them with the data areas that they own.

SUMMARY OF THE INVENTION

The present invention overcomes the disadvantages and limitations of the related art by providing a method and apparatus for efficiently verifying the authenticity of an application program being loaded into a secure area from a non-secure area and associating the verified application program with its already existing data areas in persistent memory to the exclusion of other application programs.

An advantage of the invented secure access control for persistent data areas is that application programs may be loaded from a non-secure store and be given access to persistent data without compromising security.

Yet another advantage of the invention is that the privilege levels of a processor may be utilized to protect persistent data while allowing application programs access to the data even though such application programs may not be resident in persistent memory.

These and other advantages will become apparent to the reader from the following more detailed description of the invention.

DESCRIPTION OF THE PREFERRED EMBODIMENT

Figure 1:
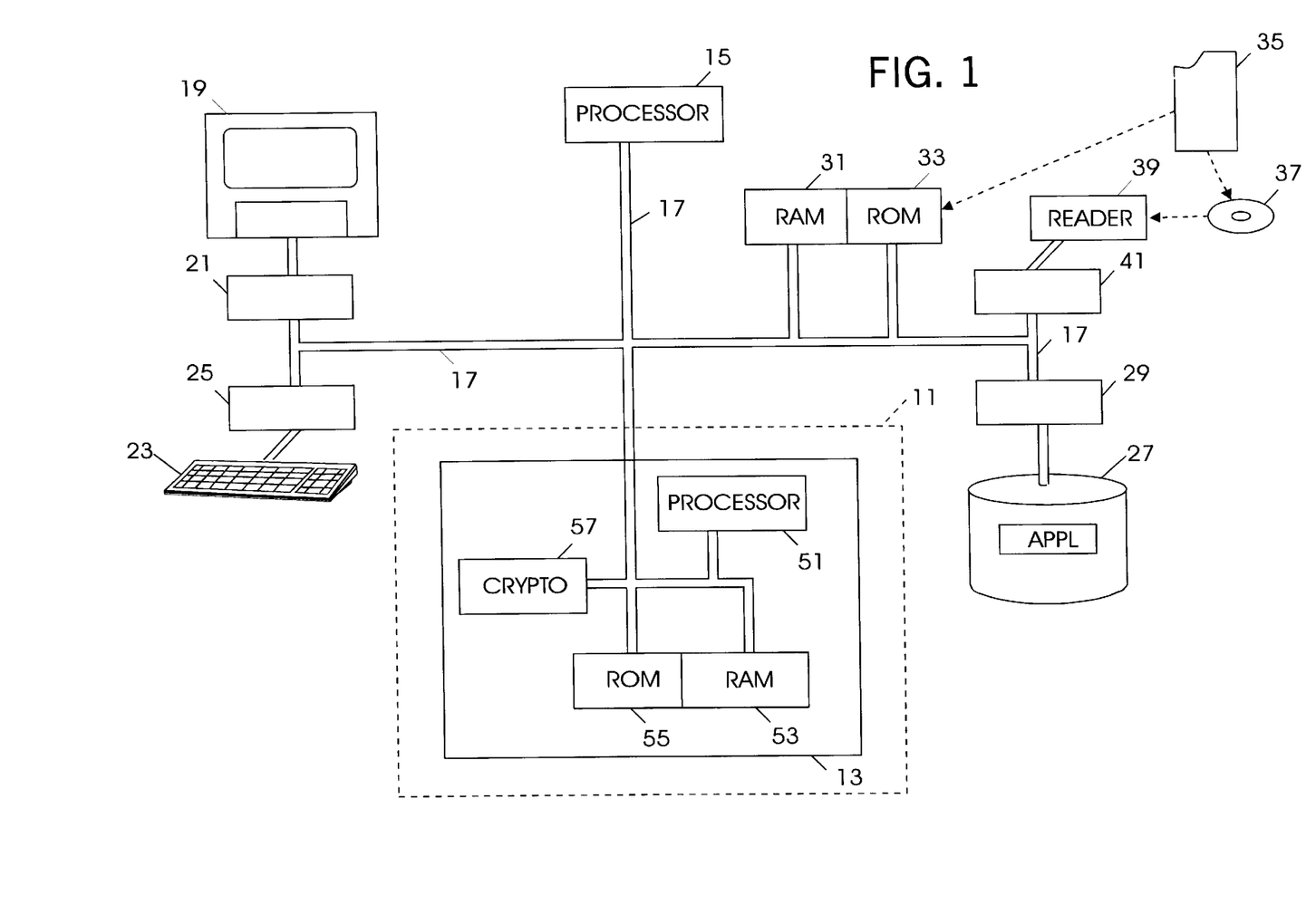
FIG. 1 is a is a block diagram of a computer system in which the invention finds utility.

Referring now to FIG. 1, for the purpose of describing the present invention in the context of a particular embodiment, a typical personal computer architecture is shown, such as the configuration used in many IBM personal computers. The present invention may also be used in other digital computer architectures, such as mini-computer and mainframe computer environments, and in local area and wide area computer networks. It is only required that the computer be physically secure so as to prevent attackers from probing or changing the circuits of the computer. In those circumstances where the computer itself cannot be made physically secure, a security card 11 having a secure module 13 such as shown in U.S. Pat. Nos. 5,159,629 and 5,027,397 may be employed in the embodiment of the invention.

The processing element of the personal computer architecture is a microprocessor 15 which may, for example, be an INTEL 80486, Pentium or similar microprocessor. The microprocessor 15 is connected to a bus 17 which comprises a set of data lines, a set of address lines and a set of control lines. A plurality of I/O devices including memory and storage devices are connected to the bus 17 through separate adapters. The I/O devices may be standard features of the personal computer, or plug-in options. For example, these devices may include a color display 19 connected through a graphics adapter 21, a keyboard 23 connected through an adapter 25 and a hard disk drive 27 connected through a SCSI adapter 29 as is known to be used in IBM computers and IBM-compatible computers. The other devices are either included as part of the personal computer or are available as plug-in options from the IBM Corporation and other suppliers.

The random access memory (RAM) 31 and the read-only memory (ROM) 33 are included as standard equipment in a personal computer, although additional random access memory to supplement RAM 31 may be added via a plug-in memory expansion option.

Within the ROM 33 are stored a plurality of instructions, known as the basic input/output operating system, or BIOS, for execution by the microprocessor 15. The BIOS controls the fundamental I/O operations of the computer. An operating system such as the IBM OS/2 operating system software by IBM Corporation, commonly used with the IBM personal computer family, is loaded into the RAM 31 and runs in conjunction with the BIOS stored in ROM 33. It will be understood by those skilled in the art that the personal computer system could be configured so that parts or all of the BIOS are stored in the RAM 31 rather than in the ROM 33 so as to allow modifications to the basic system operations by changes made to the BIOS program, which would then be readily loadable into the RAM 31. Similarly, programs, data, and knowledge representations stored in RAM 31 may be stored in ROM 33.

As shown in FIG. 1, a program 35 implementing the method of the invention is advantageously embodied as an article of manufacture by embedding the program into compact disc 37, or other portable storage media. Media 37 can be read by reader 39 connected to bus 17 by adapter 41. Further, the program 35 may be embodied as a special purpose apparatus by storing the program's executable instructions in RAM 31, ROM 33, or a combination of both and or in DASD 27, accessible by the microprocessor 15 via adapter 29, for execution by microprocessor 15.

In addition to use with the main microprocessor 15, the invention may be advantageously employed in special purpose devices such as the security card 11, also referred to as a cryptographic adapter 11, which is connected to bus 17. Again the program 35 embodying the method of the invention may be implemented as a special purpose apparatus by storing the program's executable instructions in RAM 53, ROM 55, or a combination of both and/or loaded into RAM 53 from DASD 27 as described above. Cryptographic adapter 11 also contains a cryptographic processing module 57 for efficiently executing algorithms such as the Data Encryption Standard (DES) algorithm and the Rivest Shamir & Adleman (RSA) algorithm as examples of available algorithms.

Figure 2:
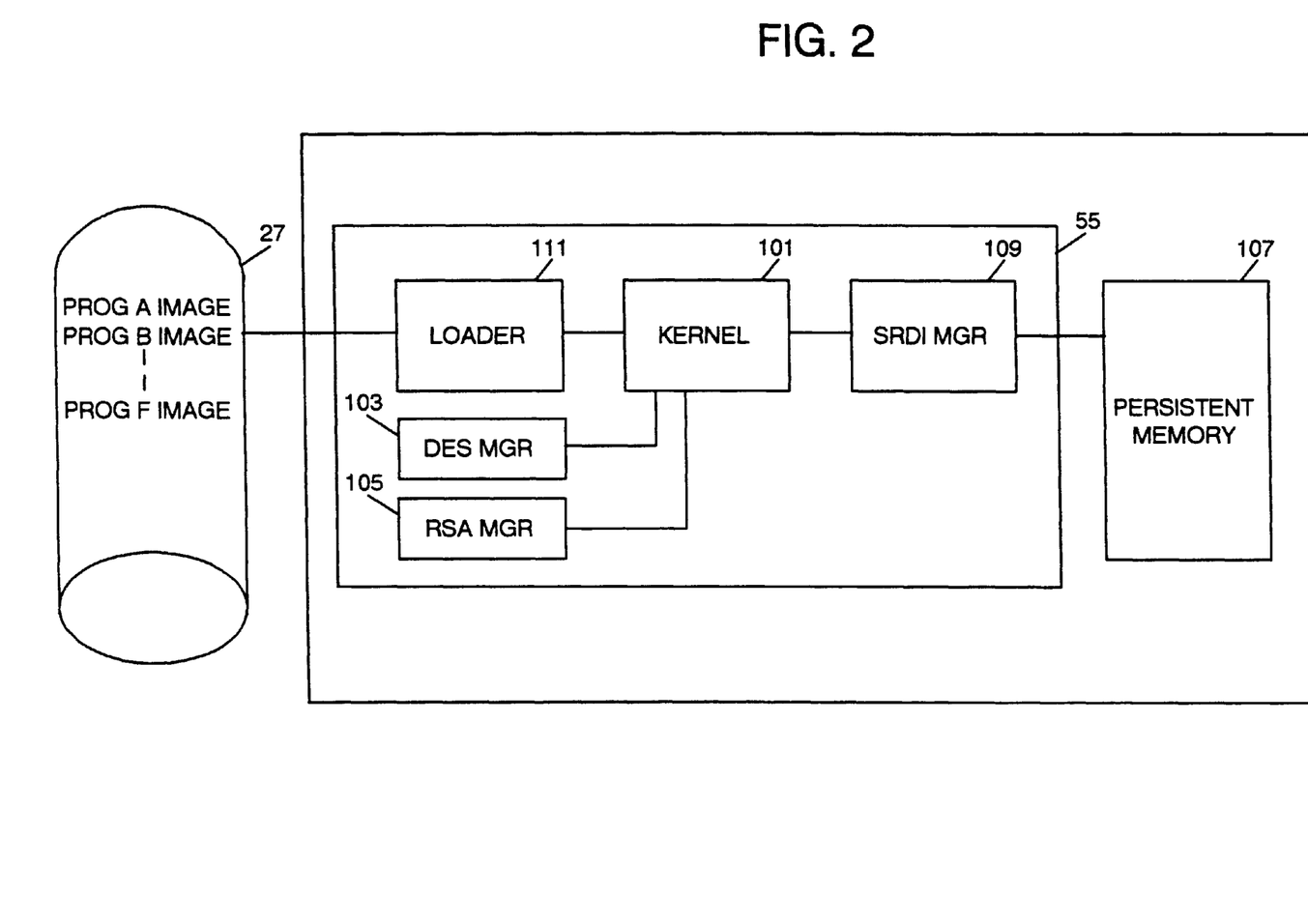
FIG. 2 is a block diagram of the improved operating system according to the invention.

The preferred embodiment of the present invention is incorporated into and made a part of an operating system such as the IBM OS/2 operating system which is shown in block diagram form in FIG. 2. For purposes of simplifying the description, the invention will be described as being embodied as part of the secure cryptographic adapter card 11 of FIG. 1 and the non-secure application source for a certified application program according to the invention will be DASD 27, which is also shown in FIG. 1.

In FIG. 2, the operating system kernel 101 appears in the center of the diagram. Kernel 101 performs the many system control functions that are needed to allow applications programs to be written and run efficiently on the computer.

Allocation of memory to an application is one of the more important control functions performed by an operating system. As described in Chapter 4 Memory Management, of OS/2 Programmers Guide, written by Ed Iacobucci and published in 1988, the OS/2 operating system allocates local address spaces for each application program and maps these local address spaces to real memory by means of Local Descriptor Tables.

As a result, there is natural isolation between the memory segments of application programs. That is, segments allocated to one application program can not be viewed or modified by another application program.

The above described method used by operating systems executing on Intel 80286 and higher microprocessors works well for applications where both the application programs and their data areas are transitory in memory and a Local Descriptor Table can be set up and new memory allocated each time an application program is loaded into volatile memory. In situations where the data area must remain in a persistent memory such as a flash memory, some way must be provided to safely re-allocate the continuously existing memory area to an application program whose authenticity has been verified and has been re-loaded into memory.

Before executing an application program being loaded from a DASD device for example, located outside the secure environment, the authenticity of the application program must be verified. Otherwise an imposter program may be loaded and the imposter program may attack the secure environment. Further, the reallocation of a persistent memory area to the loaded program must preserve isolation and must not permit a memory area of another application program to be allocated to the newly loaded program.

Verification of authenticity is accomplished in loader 111 according to the invention by prior certification of application programs and verification of application programs before they are loaded into secure memory. Isolation is accomplished by Security Relevant Data Item (SRDI) manager 109 according to the invention by comparing identification fields in a Data Area Table with application program identity. The Data Area Table is maintained for the purpose by a novel improvement to the operating system which will now be described with reference again to FIG. 2.

The RAM 53 and ROM 55 of FIG. 1 are contained within secure module 13. RAM 53 and ROM 55 contain the operating system which may be a subset of OS/2 in this cryptographic adapter card version of the invention. The kernel 101 manages memory allocation and other resources such as Data Encryption Standard Algorithm (DES) via DES resource manager 103 and Rivest Shamir & Adleman (RSA) via RSA resource manager 105.

A persistent memory such as flash memory or battery powered memory is provided at 107. The real address space of persistent memory 107 is mapped into the Global Descriptor Table and therefore is always available to the operating system and does not go away when an application using memory 107 stops running in memory 53. Allocation of addresses within memory 107 to an application program is handled by SRDI manager 109 of the invention.

An improved program loader according to the invention is provided at 111 in order to bring in and re-load an application program from un-protected DASD 113 or some other un-protected external medium. The physical protection provided to the circuits within secure module 13 can be reasonably provided but the cost and complexity to physically protect a DASD device from attack is not practical at this time. Accordingly it is necessary to ensure that an application program loaded from DASD 27 has not been modified or substituted as part of an attack on the system. This is accomplished by program loader 111 using encryption resources available to the operating system.

Before an application program is loaded and used, it is certified by the computer system owner or manufacturer or some other central party responsible for the control and security of the system. Certification is accomplished using the cryptographic facilities of security card 11 according to the invention as shown in the flow diagram of FIG. 3.

Figure 3:
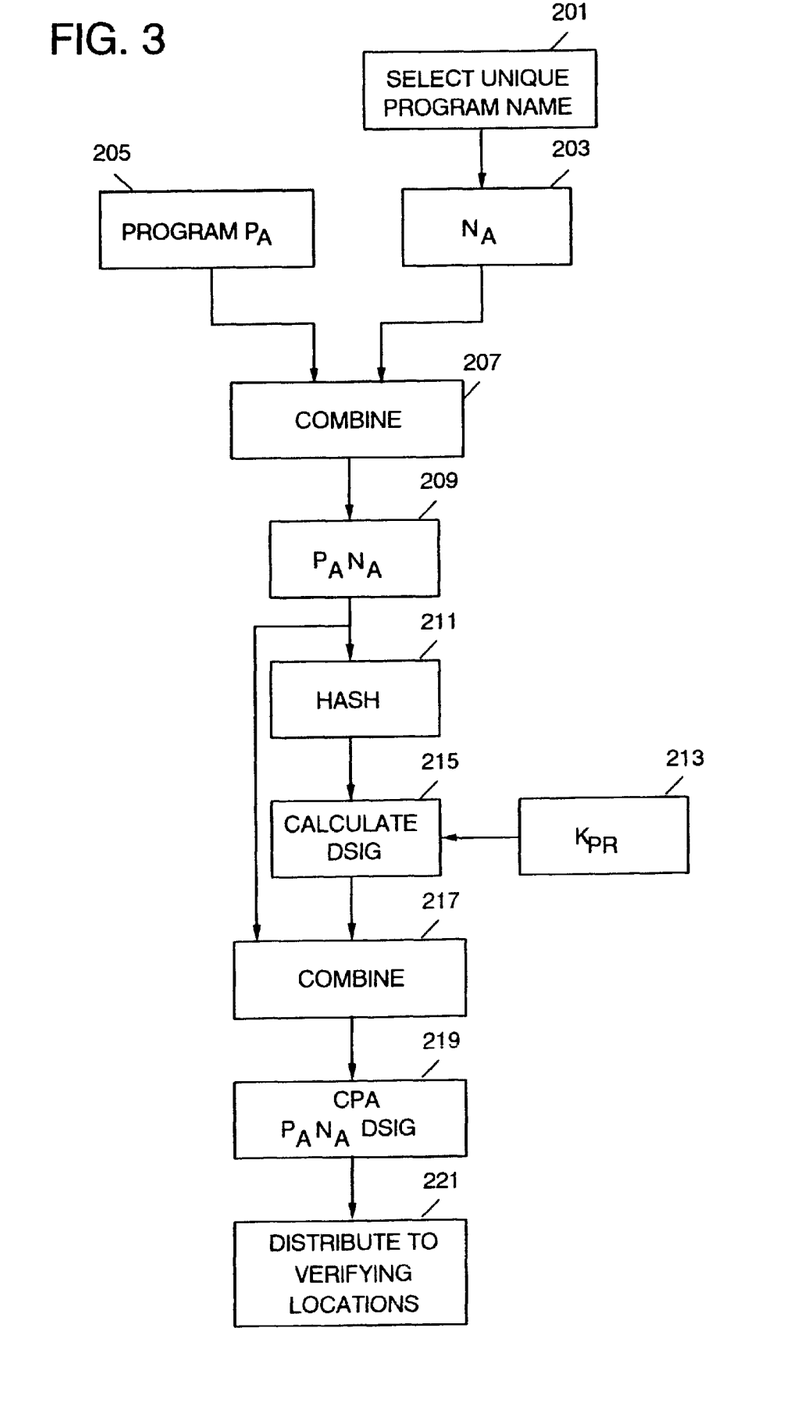
FIG. 3 is a flow diagram of an application program certification process according to the invention.

In FIG. 3, a unique name $N_A$ is selected for the program A at block 201 and stored at block 203. The name does not have to possess any special characteristics but only has to be unique within the domain of names of programs that will be certified by this particular authority. The name $N_A$ and the program $P_A$ as input at 205 are combined into a single, contiguous data object at block 207 and stored at block 209. Although other methods are possible, in the preferred embodiment, combination is done by concatenating $N_A$ to $P_A$. The combined object is referred to as $P_A N_A$.

At block 211, a hash is calculated over $P_A N_A$ to get $H(P_A N_A)$. $H(P_A N_A)$ will be of a consistent length, regardless of the size of $P_A N_A$. Also, public key techniques can usually only encrypt data that is less than the size of the key modulus such as 1024 bits for a typical RSA key.

At block 215, the certifying authority calculates a digital signature DSIG, over $H(P_A N_A)$, using a private key $K_{PR}$ retrieved at block 213 from secure persistent storage. The result of this encryption is the digital signature, DSIG. $K_{PR}$ is the private key of a public/private key pair. The corresponding public key $K_{PU}$, is made available at every computer system where the authority expects programs certified with $K_{PR}$ to be used. 30 The digital signature may be calculated using any of a number of well known techniques, including but not limited to digital signature algorithms RSA and DSA, and hashing algorithms SHA-1, MD5, MD4, and MDC.

DSIG is attached at block 217 to the combined program/name object $P_A N_A$ and stored at block 219, so that the signature DSIG is carried with the program when it is distributed and when it is loaded into a computer system. This final distributed object, containing the program, the name, and the digital signature, is referred to as Certified Program A ($CP_A$). The certified program can now be distributed at block 221 to end user locations having a secure area with persistent storage and an operating system according to the invention.

When an operating system according to the invention loads a program into a computer system, it verifies the authenticity of the program itself and of the program name, by verifying the attached digital signature DSIG. As stated above, the public key $K_{PU}$, is available to every computer system where program $P_A$ needs to be used.

Figure 4:
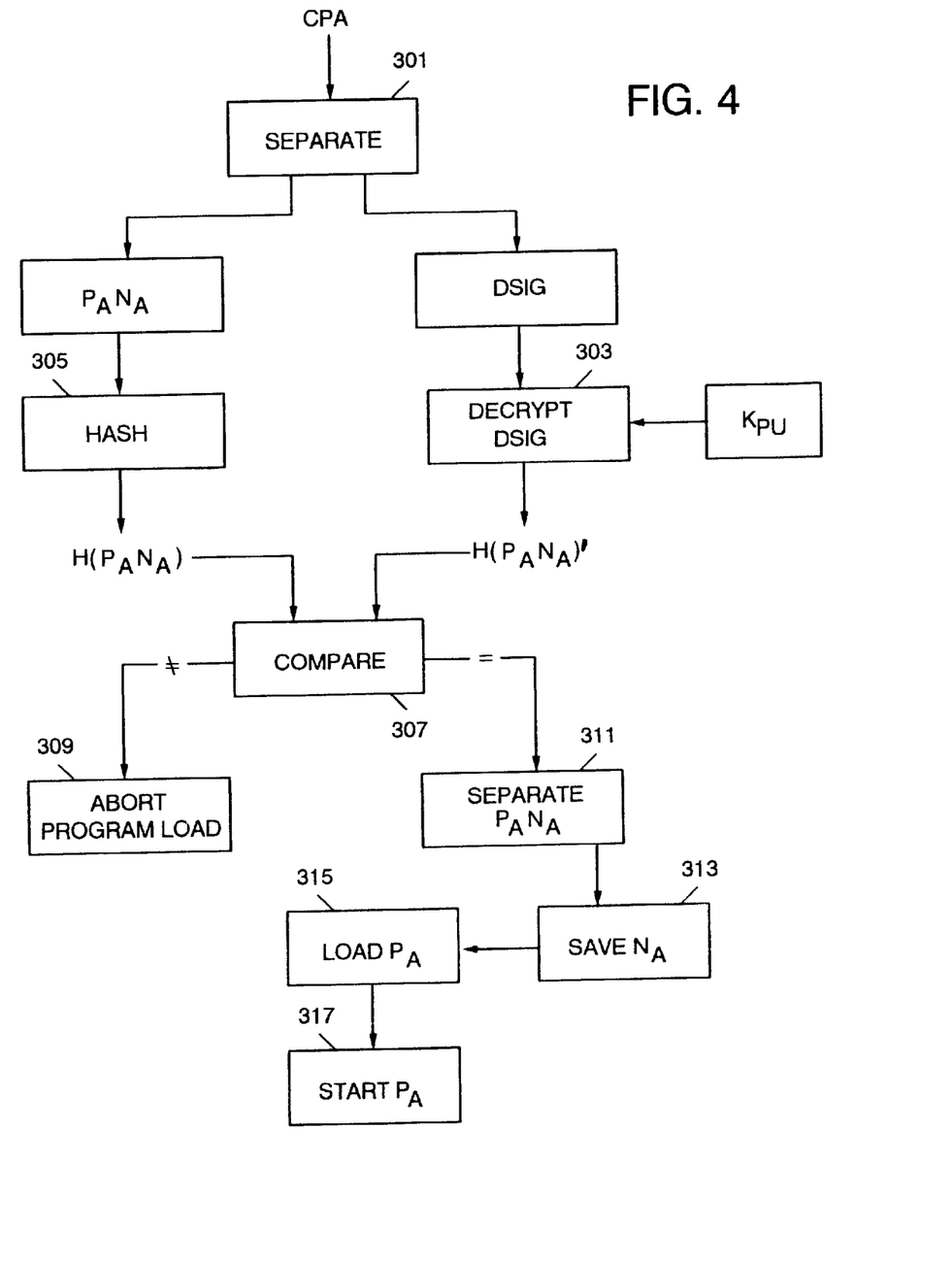
FIG. 4 is a flow diagram of application program load and verification according to the invention.

Referring now to FIG. 4, the computer's operating system will, according to the invention, perform the following steps when loading the program for execution:

At block 301, the certified program object CPA is separated into the digital signature DSIG, and the combined program/name object $P_A N_A$.

Verifying that DSIG is a valid signature for the program and its name in object $P_A N_A$ is accomplished using public key Ku according to the following steps. First the digital signature DSIG is decrypted at block 303 using the public key $K_{PU}$. If the signature DSIG was indeed created with the corresponding private key, the result of this decryption will be the hash $H'(P_A N_A)$.

Next the hash $H(P_A N_A)$ is calculated at block 305 in the same way as it was done during certification. At block 307 the results from block 303 and 305 are compared to see if $H(P_A N_A) = H'(P_A N_A)$. If they are equal, the digital signature verifies and proves that $P_A N_A$ was signed by the certifying authority and it also proves that $P_A N_A$ has not been modified.

If the signature is not correct, the loading process is aborted at block 309. If the signature is correct, the object $P_A N_A$ is separated at block 311 into the program $P_A$ and the program name $N_A$. The program name $N_A$ is saved in a data area attribute table at block 313 in operating system storage, where it cannot be altered by any program other than the operating system itself. At block 315 the program is loaded and at block 317 execution of program $P_A$ is started.

All program owned persistent data areas are managed by the computer's operating system. They cannot be accessed directly by an application program, without making a request to the operating system services.

When a program asks the operating system to allocate a new persistent data area, the operating system looks up the name of the program and stores it in a way that permanently associates it with that persistent data area. Thus, every persistent data area has attached to it a permanent, unalterable owner name field.

At some later time, when a program requests access to an existing data area, the operating system verifies that the requesting program is the creator, and hence the owner, of the data area. It compares the program's name, which it saved at the time of program loading, to the owner name which is attached to the data area itself. If the two are not identical, the program is not permitted access to the requested data area. This mechanism prevents any program from obtaining access to any other program's data, if we can guarantee that the program name cannot be forged in any way. That guarantee is provided through the program certification and program loading processes described above.

It will be understood that comparison of the unique application program name to the data area owner name need not be an exact match and other partial or complete comparisons will serve better in some systems. For example, there may be a family of programs that require access to the same persistent data area and to accomplish such access permission, all names may be assigned by the certifying authority to begin with the same characters but end with differing suffixes. The XYZ family of programs may include XYZA, XYZB, etc. In this example, only the xyz portion of the name will be required to match the persistent data area owner name. Like wise, matches may be other than exact matches but may be complements, reversed order characters and other such variations with out departing from the scope of the invention.

Figure 5:
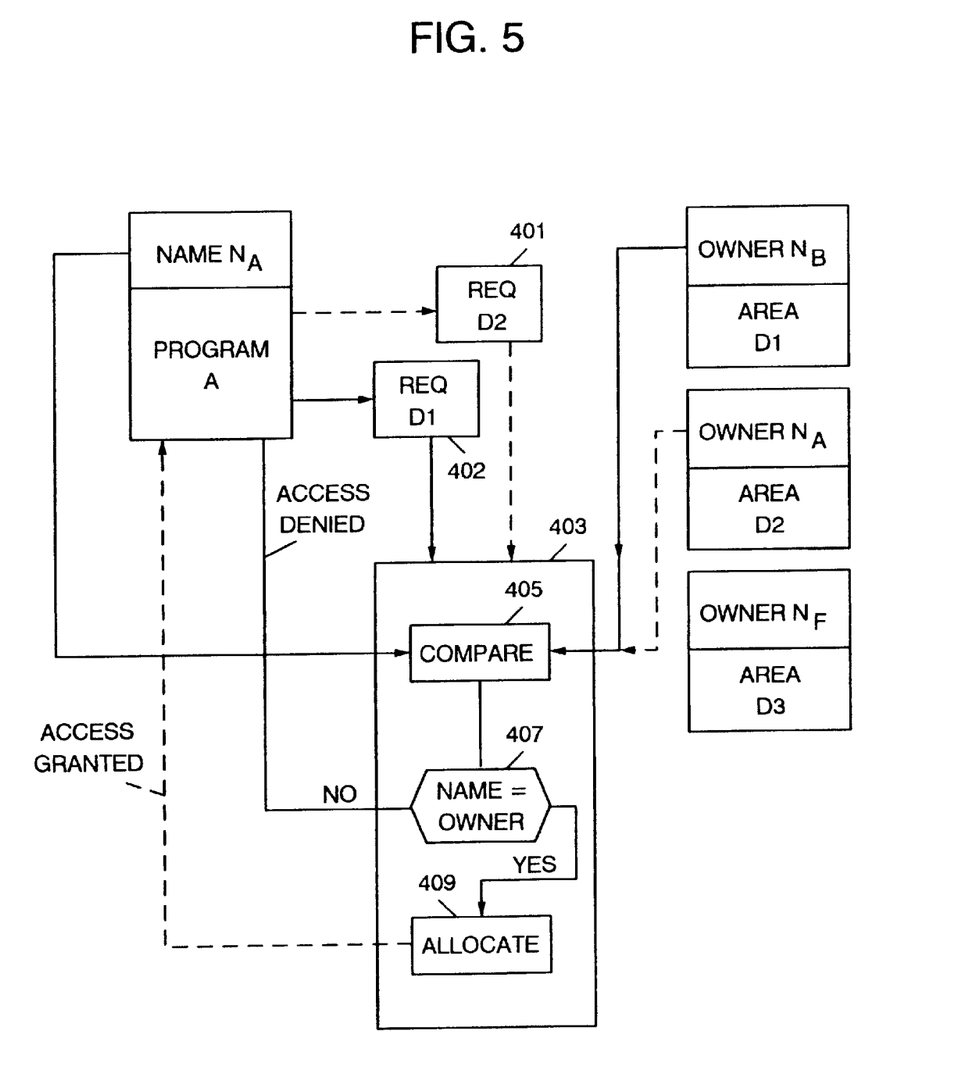
FIG. 5 is a flow diagram of application program access to a data area.

Data area access control is illustrated in the flow diagram of FIG. 5, where the following steps take place. Application program A, which has the name $N_A$, requests at block 401, access to data area D2. This request goes to the SRDI manager 109 at block 403 following the dashed line paths. The SRDI manager retrieves the name $N_A$ that it saved for program A when that program was loaded. The SRDI manager then examines the owner name associated with data area D2.

The SRDI manager compares the two values at block 405, and finds at block 407 that the requester Name ($N_A$) equals the data Owner name ($N_A$), and access can be granted by allocating at block 409 the data area D2 to the Local Descriptor Table of program A.

FIG. 5 also shows, in solid line paths, an attempt to access a data area that is owned by a different program where the following steps take place. Application program A, which has the name $N_A$, requests at block 402, access to data area D1. This request goes to the SRDI manager at block 403 by the solid line paths. The SRDI manager retrieves the name it saved for program A when that program was loaded. Again this name is $N_A$. The SRDI manager then examines the owner name associated with data area D1, and finds that this name is NB. At block 405, the SRDI manager compares the two values, and since the requester name ($N_A$) is not equal to the data owner name (NB), access is denied without allocating memory and therefore program A can not access data owned by program B. It will be understood that although in this preferred embodiment, comparison was conducted for equality, other comparisons can alternately be performed in order to match the program name to the data owner's name.

It will be understood that allowing access to a data area in persistent memory can be accomplished by allocation as described above or by actually copying data from an area allocated by its Local Descriptor Table to the SRDI manager at protection level zero, to another area in RAM. This other area in RAM is allocated by the Local Descriptor Table of the SRDI manager at level zero and will also be allocated to the requesting application program via its Local Descriptor Table at level three.

This invention provides a secure way to associate persistent data in a secure area with transient application programs that originate outside the secure area. When a program is loaded, its authenticity is verified and it is automatically associated with data areas it created, and no program can obtain access to any data area created by a different program.

Of course, many modifications and adaptations to the present invention could be made to advantage without departing from the spirit of this invention. Further some features of the present invention could be used without corresponding use of other features. Accordingly, this description should be considered as merely illustrative of the principles of the present invention and not in limitation thereof.

What is claimed is:

1. A method for loading a certified program CP from external storage into a secure area for execution in the secure area, the certified program CP having an object PN and an attached digital signature DPN, the method comprising the acts of:
   requesting an operating system resident in the secure area load the program CP;
   retrieving CP from external storage into operating system protected mode memory;
   separating in protected mode memory in the secure area, the digital signature DPN from the object PN of certified program CP;
   validating that digital signature DPN, using a public key corresponding to the private key of a public-private key pair algorithm which was used to generate DPN, is a valid signature for the object PN;
   separating a program P from a name N of the object PN;
   loading program P into memory for execution;
   storing name N in protected operating system memory for later use in allowing access by program P to a data file stored in a memory in the secure area.

2. Method of claim 1 further comprising acts of:
   receiving at the operating system, a request by the program P for access to a data object;
   retrieving from protected memory, the name N of program P;
   retrieving from the data object D an owner name n;
   comparing the name N with the owner name n;
   granting access by program P to data object D when name N and owner name n match; and
   denying access by program P to data object D when name N and owner name n do not match.

3. Apparatus for loading a certified program CP from external storage into a secure area for execution in the secure area, the certified program CP having an object PN and an attached digital signature DPN, comprising:
   means for requesting an operating system resident in the secure area load the program CP;
   means for retrieving CP from external storage into operating system protected mode memory;
   means for separating in protected mode memory in the secure area, the digital signature DPN from the object PN of certified program CP;
   means for validating that digital signature DPN, using a public key corresponding to the private key of a public-private key pair algorithm which was used to generate DPN, is a valid signature for the object PN;
   means for separating a program P from a name N of the object PN;
   means for loading program P into memory for execution;
   means for storing name N in protected operating system memory for later use in allowing access by program P to a data file stored in a memory in the secure area.

4. Apparatus of claim 3 further comprising:
   means for receiving at the operating system, a request by the program P for access to a data object;
   means for retrieving from protected memory, the name N of program P;
   means for retrieving from the data object D an owner name n;
   means for comparing the name N with the owner name n;
   means for granting access by program P to data object D when name N and owner name n match, and denying access by program P to data object D when name N and owner name n do not match.

5. A computer program product having a computer readable medium having computer program logic recorded thereon for loading a certified program CP from external storage into a secure area for execution in the secure area, the certified program CP having an attached digital signature DPN, the program product comprising:
   means for requesting an operating system resident in the secure area load a program CP;
   means for retrieving CP from external storage into operating system protected mode memory;
   means for separating in protected mode memory in the secure area, the digital signature DPN from the object PN of certified program CP;
   means for validating that digital signature DPN, using a public key corresponding to the private key of a public-private key pair algorithm which was used to generate DPN, is a valid signature for the object PN;
   means for separating a program P from a name N of the object PN;

means for loading program P into memory for execution;

means for storing name N in protected operating system memory for later use in allowing access by program P to a data file stored in a memory in the secure area.

6. Computer program product of claim 5 further comprising:

means for receiving at the operating system, a request by the program P for access to a data object;

means for retrieving from protected memory, the name N of program P;

means for retrieving from the data object D an owner name n;

means for comparing the name N with the owner name n;

means for granting access by program P to data object D when name N and owner name n match, and denying access by program P to data object D when name N and owner name n do not match.

\* \* \* \* \*